US012592890B1

(12) United States Patent
Soundappan et al.

(10) Patent No.: US 12,592,890 B1
(45) Date of Patent: Mar. 31, 2026

(54) CONTENT-BASED COMMUNICATION ROUTING SYSTEMS

(71) Applicant: Citibank, N.A., New York, NY (US)

(72) Inventors: Saravanan Soundappan, Irving, TX (US); Umesh Reddy, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/290,025

(22) Filed: Aug. 4, 2025

(51) Int. Cl.
*G06F 13/00* (2006.01)
*H04L 47/125* (2022.01)
*H04L 47/20* (2022.01)

(52) U.S. Cl.
CPC ............ *H04L 47/125* (2013.01); *H04L 47/20* (2013.01)

(58) Field of Classification Search
CPC .............................. H04L 47/125; H04L 47/20
USPC ....... 709/201, 238, 241, 242, 243, 245, 224; 718/105, 102, 100
See application file for complete search history.

(56) References Cited

U.S. PATENT DOCUMENTS

| | | | | |
|---|---|---|---|---|
| 12,316,540 B1 * | 5/2025 | Delecroix | ............... | H04L 45/64 |
| 12,375,386 B1 * | 7/2025 | Reddy | .................... | H04L 45/02 |

* cited by examiner

*Primary Examiner* — Kenneth R Coulter
(74) *Attorney, Agent, or Firm* — Perkins Coie LLP

(57) ABSTRACT

Systems and methods for content-based routing of network traffic for distributed computing services are disclosed. A load balancing device monitors real-time network traffic data communicated to distributed computing services hosted on computing devices across multiple data centers. The load balancing device receives a user request to add a new distributed computing service, including a content map mapping service parameters to target devices. The load balancing device is configured to transmit incoming traffic requests for the new service to computing devices in either a cloud-based or on-premises data center by adding the content map to its routing configuration. Upon receiving an incoming request, the system determines if it corresponds to the new service, identifies a target device mapped to the request parameters using the content map, and transmits the request to the target device.

20 Claims, 7 Drawing Sheets

300

| Mappable Service Parameters | Target Device ID | Data Center ID | Data Center Environment |
|---|---|---|---|
| (USER_ID, LOCATION, TRANSACTION_TYPE) | C001 | DC001 | On Premises |
| (USER_ID, LOCATION, PRODUCT_CATEGORY) | C002 | DC001 | On Premises |
| (USER_ID, LOCATION, SUBSCRIPTION_TIER) | C003 | DC002 | Cloud |
| (DEVICE_TYPE, DURATION, QUERY_PARAMS) | C004 | DC003 | Cloud |
| (DEVICE_TYPE, DURATION, LANGUAGE) | C005 | DC004 | On Premises |
| (DEVICE_TYPE, DURATION, CONTENT_TYPE) | C006 | DC005 | On Premises |

302    304    306    308

Content Map 310A

Content Map 310B

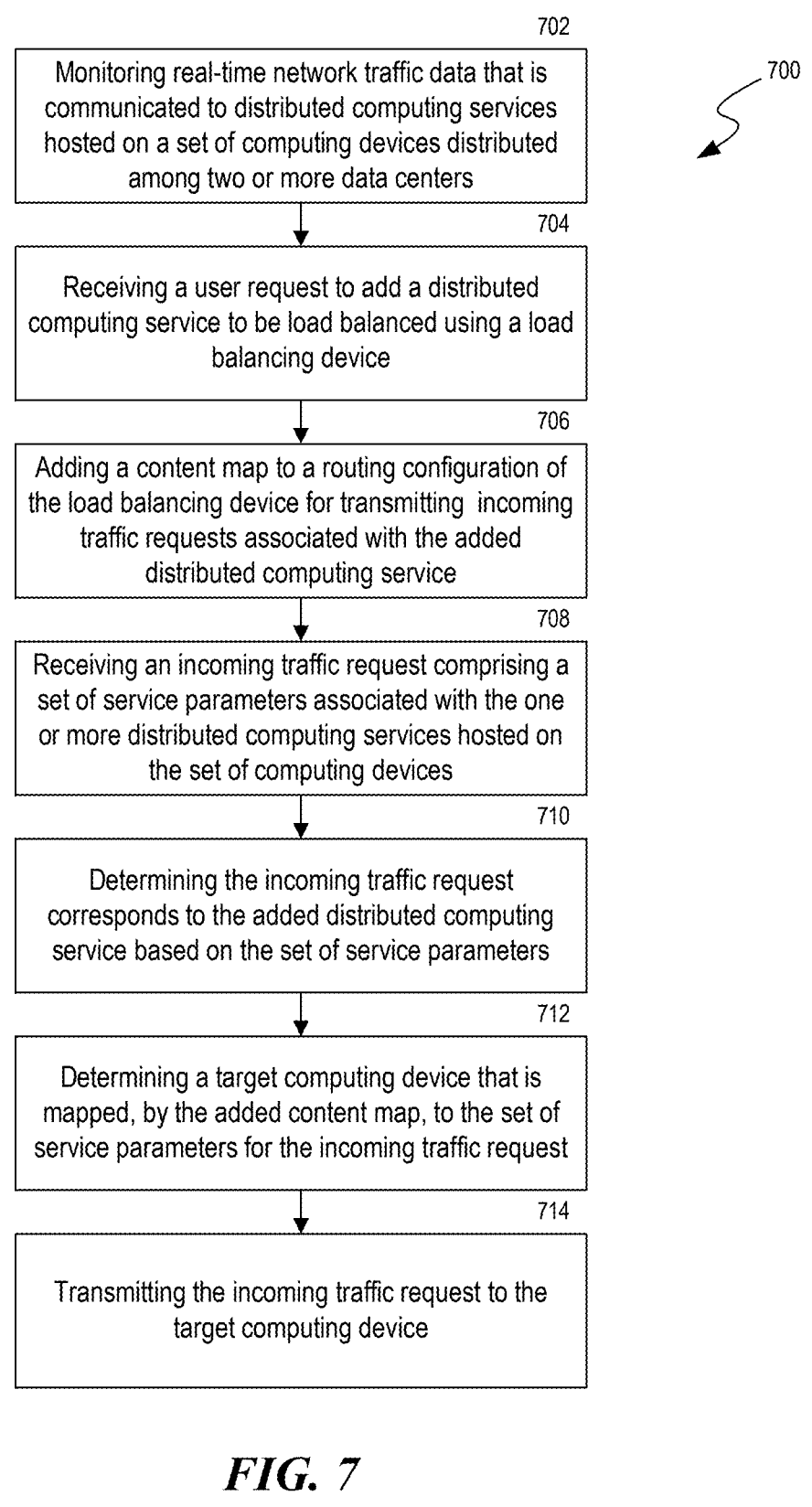

Monitoring real-time network traffic data that is communicated to distributed computing services hosted on a set of computing devices distributed among two or more data centers

700

704

Receiving a user request to add a distributed computing service to be load balanced using a load balancing device

706

Adding a content map to a routing configuration of the load balancing device for transmitting incoming traffic requests associated with the added distributed computing service

708

Receiving an incoming traffic request comprising a set of service parameters associated with the one or more distributed computing services hosted on the set of computing devices

710

Determining the incoming traffic request corresponds to the added distributed computing service based on the set of service parameters

712

Determining a target computing device that is mapped, by the added content map, to the set of service parameters for the incoming traffic request

714

Transmitting the incoming traffic request to the target computing device

*FIG. 7*

CONTENT-BASED COMMUNICATION ROUTING SYSTEMS

SUMMARY

Modern distributed computing architectures encounter significant challenges in the efficient routing of network traffic (e.g., incoming application programming interface (API) requests) across multiple computing devices (e.g., servers) and data center environments (e.g., cloud-based and on-premises infrastructure). Conventional routing systems often lack the flexibility to dynamically accommodate evolving service requirements, resulting in suboptimal resource utilization and potential service disruptions. Furthermore, conventional approaches typically require complex manual configurations and specialized knowledge of underlying network topologies, which can impede application development teams from quickly deploying and managing their services. These limitations may result in increased operational overhead, extended deployment times, and reduced agility in responding to changing service requirements.

To address these challenges, methods and systems are disclosed herein for a robust communication routing system that enables dynamic, content-based routing between cloud and on-premises environments. Methods and systems disclosed herein may address these challenges using a load balancing device with configurable content maps for routing traffic to distributed computing services. The system may monitor real-time incoming network traffic data for distributed computing services. In particular, the system may monitor, at a load balancing device, real-time network traffic data that is communicated to one or more distributed computing services hosted on a set of computing devices distributed among two or more data centers. The load balancing device may transmit incoming traffic requests within the real-time network traffic data to one or more computing devices of the set of computing devices based on a routing configuration. The routing configuration may include a first content map for a first distributed computing service. The first content map may map one or more first service parameters within the incoming traffic requests for the first distributed computing service to one or more first target devices within a first subset of computing devices of the set of computing devices.

In one example, the load balancing device may analyze incoming API requests to extract custom parameters for the distributed computing services, such as user IDs, transaction types, or data categories. These parameters may then be matched against rules in the content map to determine which specific server or microservice instance should handle each request. In some embodiments, the content map may include complex logic to route requests based on combinations of parameters, such as sending high-priority users to dedicated high-performance servers. In some embodiments, the system may maintain separate content maps for different applications or microservices, allowing fine-grained routing based on application-specific parameters. The load balancing device may use these content maps to dynamically direct traffic to appropriate backend servers across multiple data centers, ensuring optimal resource utilization and service availability.

The system may then receive a user request to add a new distributed computing service. In particular, the system may receive, via a graphical user interface, a user request to add a second distributed computing service to be load balanced using the load balancing device. The user request may include an indication of a second, or new, content map for the second distributed computing service. The second content map may map one or more second service parameters within the incoming traffic requests for the second distributed computing service to one or more second target devices within a second subset of computing devices of the set of computing devices. The second subset of computing devices may be distributed, in part, among a first data center corresponding to a cloud-based computing environment and a second data center corresponding to an on-premises computing environment.

For example, the system may receive a configuration request for deploying a new microservice from an online web portal of an application team. The configuration request may include custom routing rules based on request attributes like API versions or feature flags. The portal may allow drag-and-drop creation of routing logic, mapping specific parameter values or ranges to target servers across hybrid cloud and on-premises environments. In some embodiments, the system may provide templates or intuitive forms to guide users through defining complex routing scenarios without requiring low-level networking knowledge. In some embodiments, the system may offer predefined templates or suggest optimal configurations based on expected traffic patterns and/or characteristics of the application. The user interface may also provide real-time validation and visualization of the proposed routing rules to help users understand the impact of their configuration choices.

The system may then configure the load balancing device based on the user request. In particular, the system may, responsive to receiving the user request, configure the load balancing device to transmit the incoming traffic requests associated with the second distributed computing service to computing devices within either the first data center or the second data center by adding the second content map to the routing configuration of the load balancing device. For example, the system may automatically generate and deploy updated load balancer configurations incorporating the new routing rules, without requiring manual editing of configuration files or restarts of networking components. In some embodiments, the system may perform validation checks to ensure the new rules do not conflict with existing configurations or security policies before applying the changes. In some embodiments, the system may also create backup copies of the previous configuration to allow for quick rollback. Once the new content map is added, the load balancing device may immediately begin routing traffic for the new service according to the specified rules, enabling rapid deployment and scaling of distributed applications.

The system may then process an incoming traffic request. In particular, the system may receive, from the real-time network traffic data, an incoming traffic request that includes a set of service parameters associated with the one or more distributed computing services hosted on the set of computing devices. For example, the system may intercept an incoming API call and extract relevant metadata or service specific parameters (e.g., from custom headers, query parameters, or message payloads) that indicate for which service the request is intended. The extracted service parameters may include details such as tenant identifiers, feature flags, data classifications, or any other application-defined attributes that can influence routing decisions.

The system may then determine to which computing service the request corresponds. In particular, the system may determine, based on the set of service parameters, that the incoming traffic request corresponds to the second distributed computing service. For example, the load balancing device may compare the extracted service parameters against the routing rules defined in its content maps to identify which specific service or microservice should handle the request. In some embodiments, the system may use pattern matching algorithms or decision trees to efficiently evaluate multiple routing criteria and determine the best match. If the parameters indicate that the request is intended for the newly added second distributed computing service, the system will proceed to use the corresponding content map for further processing. In some embodiments, the system may use pattern matching or machine learning techniques to classify requests when exact matches are not found.

The system may then determine a target device for the request. In particular, the system may, in response to determining that the incoming traffic request corresponds to the second or newly added distributed computing service, determine a target computing device that is mapped, by the second content map, to the set of service parameters for the incoming traffic request. The target computing device may be within either the first data center or the second data center. For example, once the system has identified that the request should be handled by the second distributed computing service, it may evaluate the specific service parameters of the traffic request against the routing rules defined in the second content map. In some embodiments, the system may check multiple criteria such as the current workload of available servers, data locality preferences, or specific feature requirements indicated in the request. In some embodiments, the system may use weighted algorithms that consider both the routing rules and real-time performance metrics to select the optimal target device. The chosen target could be a virtual machine in a cloud environment or a physical server in an on-premises data center, depending on the application's hybrid deployment strategy.

The system may then forward the request to the selected target computing device. In particular, the system may transmit (e.g., via the load balancing device) the incoming traffic request to the target computing device. In some embodiments, once the target computing device has been determined, the load balancing device may rewrite necessary headers or encapsulate the original request as needed to ensure proper routing through the network. In some embodiments, the system may add metadata to the forwarded request to facilitate tracing and monitoring throughout the service chain. The system may also perform any required protocol translations or security checks before sending the request to the target device. By intelligently directing each request to the most appropriate computing resource, the system ensures efficient utilization of distributed infrastructure while maintaining application performance and availability.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates an example table representing a routing configuration for a load balancing device, in accordance with one or more embodiments of this disclosure.

FIG. 7 is a flowchart of operations for monitoring, configuring, and routing incoming traffic requests, in accordance with one or more embodiments of this disclosure.

DETAILED DESCRIPTION

Figure 1:
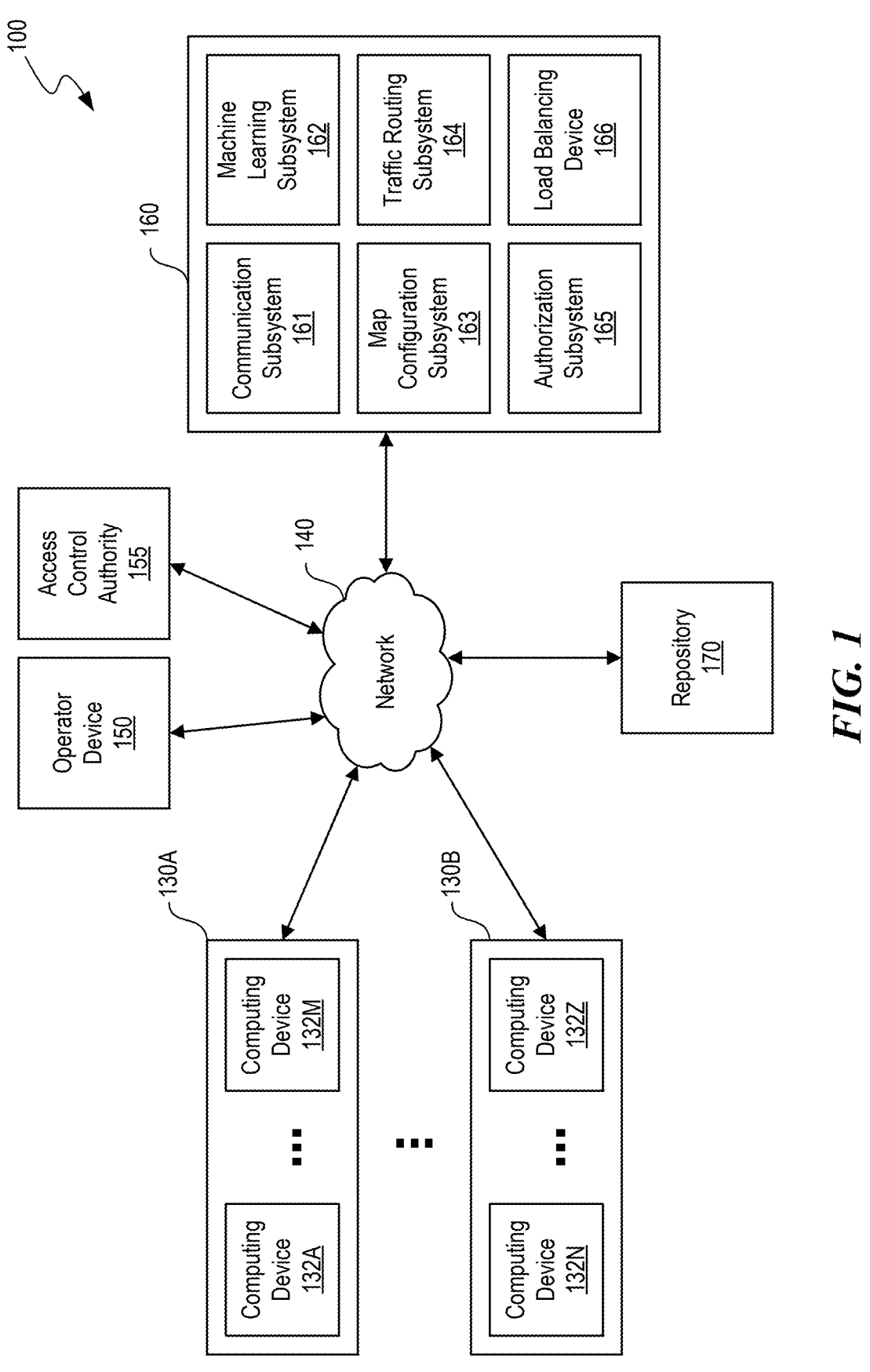
FIG. 1 shows an illustrative system for monitoring and dynamically routing incoming traffic requests to target computing devices, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

The disclosed technology provides a system and method for routing network traffic of distributed computing services based on contents of the network traffic. The system may include a load balancing device configured to monitor real-time network traffic data communicated to one or more distributed computing services hosted on a set of computing devices distributed among two or more data centers. The load balancing device may utilize a routing configuration that includes content maps that map service parameters within incoming traffic requests to target devices within subsets of computing devices. The system may allow for dynamic addition of new distributed computing services through a user interface, where users may provide content maps for new services that map service specific parameters to target devices distributed across different computing environments, such as cloud-based and on-premises data centers.

The system may process incoming traffic requests by extracting service parameters and determining the corresponding distributed computing service based on those parameters. The system may then use the appropriate content map within the routing configuration to identify a target computing device mapped to the extracted service parameters, which may be located in either a cloud-based or on-premises data center. In some examples, the content maps may be transformed into adjacency data structures that include nodes representing variable composites of mappable service parameters (e.g., unique combinations of service parameter values) and target computing devices, with links between nodes indicating mapping relationships. The system may incorporate load servicing ratings for target devices, updating the adjacency data structure with selection weights for links to prioritize traffic routing based on device capacity and/or availability. The system may dynamically update these weights based on modified load servicing ratings retrieved from monitored target devices, allowing for real-time adaptation to changing network conditions and device capacities.

The system may employ machine learning techniques to handle new combinations of service parameters not explicitly defined in existing content maps. The system may input these novel parameter combinations into a machine learning model to determine candidate target devices based on existing mappings, generating new content map entries to accommodate emerging traffic patterns. The system may also incorporate access control mechanisms, pausing the addition of new content maps if the requesting user lacks necessary operating permissions. The system may automatically determine relevant access control authorities, request permission assignments, and store the status of pending content map additions until required permissions are received. This comprehensive approach to traffic routing and service management enables efficient, secure, and adaptable handling of network requests across diverse computing environments, accommodating both established and newly introduced distributed computing services.

By monitoring real-time network traffic, dynamically configuring routing based on content maps, and intelligently distributing incoming requests across cloud and on-premises environments, the disclosed technology may enable efficient and flexible management of distributed computing services. The system may reduce latency and improve resource utilization by routing traffic to optimal target devices based on service parameters and real-time load conditions. The content-based routing approach may allow for seamless integration of new services and adaptation to changing traffic patterns without disrupting existing operations. The system may enhance security and compliance by enforcing access controls and permissions for routing configuration changes, while providing a user-friendly interface for service onboarding and management. The adaptive nature of the system may enable organizations to optimize performance and cost-efficiency across hybrid cloud environments, responding dynamically to varying workloads and service requirements.

For instance, the disclosed technology may be used to deploy a new real-time analytics service within a large-scale distributed computing environment that supports multiple microservices. The system administrator may use the graphical user interface to define a content map for the new analytics service, specifying routing rules that direct requests containing specific parameters (e.g., user location identifiers, data processing types, and timestamp ranges) to appropriate target computing devices distributed across cloud-based data centers in North America and on-premises infrastructure in Europe for data residency compliance. The load balancing device may automatically transform this content map into an adjacency data structure with weighted connections (e.g., assigning higher selection weights to geographically closer servers and lower weights to distant ones based on current load servicing ratings), enabling intelligent traffic distribution without requiring manual configuration of individual server endpoints or complex networking rules. When incoming API requests arrive with service parameters indicating European user data (e.g., location headers specifying "EU-WEST" and data classification tags marked as "GDPR-SENSITIVE"), the system may seamlessly identify these requests as belonging to the new analytics service and route them to on-premises European servers, while simultaneously directing North American traffic to cloud-based instances. The machine learning subsystem may continuously monitor traffic patterns and automatically generate new routing entries for previously unseen parameter combinations (e.g., requests from newly supported mobile platforms or emerging data processing categories), ensuring the analytics service scales dynamically without service interruptions or the need for additional manual intervention from operations teams.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

FIG. 1 shows an illustrative system 100 for monitoring and dynamically routing incoming traffic requests to target computing devices, in accordance with one or more embodiments of this disclosure. For example, the system 100 may be used to route network traffic to distributed services hosted on computing devices across multiple data centers (e.g., cloud-based and on-premises infrastructure). In some embodiments, the system 100 may utilize content maps to direct incoming traffic requests to appropriate target devices based on service parameters contained within the requests. The content maps may enable intelligent routing decisions that optimize resource utilization and service availability. In cases where the incoming traffic requests contain service parameters not explicitly defined in existing content maps, the system can employ machine learning techniques to determine appropriate target devices based on similar parameter patterns and update the routing configuration accordingly.

For example, the system 100 may include a communication routing system 160 able to monitor real-time network traffic and route incoming requests based on content-specific parameters. The communication routing system 160 may include software, hardware, or a combination of the two. For example, the communication routing system 160 may be a physical server or a virtual server that is running on a physical computer system. In some embodiments, the communication routing system 160 may be configured on a user device (e.g., a laptop computer, a smartphone, a desktop computer, an electronic tablet, or another suitable user device) and configured to execute instructions for content-based routing. In particular, the communication routing system 160 may include several subsystems each configured to perform one or more steps of the methods described herein, such as a communication subsystem 161, a machine learning subsystem 162, a map configuration subsystem 163, a traffic routing subsystem 164, an authorization subsystem 165, and a load balancing device 166. In some embodiments, one or more operations described herein can be performed by the load balancing device 166 of the communication routing system 160.

In some embodiments, the system 100 may include a content-based communication routing system for managing network traffic across distributed computing environments. The system 100 may include multiple interconnected components that work together to route incoming traffic requests to appropriate target devices based on the content of the requests. The system 100 may utilize a routing configuration (e.g., a set of rules, policies, and/or mappings that determine how network traffic should be directed, and/or the like) comprising one or more content maps (e.g., data structures that associate specific service parameters with target devices, logical mappings between request attributes and destination servers, and/or the like) to efficiently direct network traffic to the most suitable computing resources.

In some embodiments, the system 100 may include a first data center 130A and a second data center 130B. The first data center 130A and the second data center 130B may represent physical or virtual facilities that house computing resources (e.g., servers, storage systems, networking equipment, and/or the like) used to host distributed computing services. The first data center 130A may correspond to a cloud-based computing environment (e.g., a remote, virtualized infrastructure provided by a cloud service provider, a scalable and on-demand computing platform, and/or the like), while the second data center 130B may correspond to an on-premises computing environment (e.g., a local, physical infrastructure owned and operated by an organization, a private data center within an enterprise's facilities, and/or the like). This distributed architecture may allow the system 100 to leverage the benefits of both cloud and on-premises resources, providing flexibility in resource allocation and data management. For example, the cloud-based environment of the first data center 130A may offer scalability and cost-efficiency for handling variable workloads, while the on-premises environment of the second data center 130B may provide greater control over sensitive data and legacy applications.

In some embodiments, each data center may include multiple computing devices. The first data center 130A may include a computing device 132A and a computing device 132M, while the second data center 130B may include a computing device 132N and a computing device 132Z. These computing devices (e.g., servers, virtual machines, containers, and/or the like) may host the distributed computing services that process the incoming traffic requests. The use of multiple computing devices within each data center may enable load balancing, fault tolerance, and scalability of the hosted services. For instance, incoming requests may be distributed across the computing devices 132A and 132M in the first data center 130A to prevent any single device from becoming overwhelmed, while the computing devices 132N and 132Z in the second data center 130B may provide redundancy for critical on-premises applications.

In some embodiments, the system 100 may include or use a communication network 140 that interconnects the various components of the system. The communication network 140 may facilitate the exchange of data and control signals between the data centers, computing devices, and other system components. The communication network 140 may include various networking technologies and protocols (e.g., Ethernet, TCP/IP, fiber optic connections, wireless protocols, and/or the like) to enable efficient and reliable communication across the distributed system. For example, the communication network 140 may provide high-bandwidth, low-latency connections between the first data center 130A and the second data center 130B to support real-time data synchronization and workload distribution.

In some embodiments, the system 100 may include an operator device 150 that allows system administrators or operators to interact with and manage the content-based communication routing system. The operator device 150 may be a computer, tablet, smartphone, or other computing device with a user interface (e.g., a graphical user interface, command-line interface, and/or the like) that enables configuration and monitoring of the system components. Through the operator device 150, administrators may perform tasks such as defining routing rules, managing content maps, monitoring system performance, and troubleshooting issues. For instance, an administrator may use the operator device 150 to add a new distributed computing service to the routing configuration, specifying the service parameters and target devices for the new service.

In some embodiments, the system 100 may include an access control authority 155 that manages security and access permissions for the content-based communication routing system. The access control authority 155 may include a centralized or distributed component responsible for authenticating users, authorizing actions, and enforcing security policies across the system. The access control authority 155 may maintain user accounts, roles, and permissions, ensuring that only authorized individuals can make changes to the routing configuration or access sensitive system resources. For example, the access control authority 155 may verify the credentials of an administrator using the operator device 150 before allowing them to modify the content maps or add new services to the load balancing device.

In some embodiments, the system 100 may include a communication routing system 160 that serves as the core component for managing and executing the content-based routing logic. The communication routing system 160 may include several interconnected subsystems, each responsible for specific aspects of the routing process. These subsystems may work together to analyze incoming traffic requests, determine the appropriate target devices based on the request content, and efficiently route the traffic across the distributed computing environment. The communication routing system 160 may be implemented using a combination of hardware and software components, potentially leveraging containerized technologies for modularity and scalability.

In some embodiments, the communication routing system 160 may include a communication subsystem 161 that handles the reception and transmission of network traffic. The communication subsystem 161 may interface with the communication network 140 to receive incoming traffic requests and forward them to the appropriate target devices based on the routing decisions made by other subsystems. The communication subsystem 161 may implement various network protocols and optimizations to ensure efficient and reliable data transfer across the distributed system. For example, the communication subsystem 161 may use load balancing techniques to distribute incoming requests across multiple network interfaces, improving overall system throughput and resilience.

In some embodiments, the communication routing system 160 may include a machine learning subsystem 162 that uses various machine learning algorithms (e.g., neural networks, decision trees, reinforcement learning, and/or the like) to predict optimal target devices for incoming requests (e.g., when service parameters of incoming requests fail to match with mapped target devices). For instance, the machine learning subsystem 162 may identify correlations between unmapped service parameters and mapped target devices, allowing the system to make more intelligent routing decisions for new or unfamiliar request types.

In some embodiments, the communication routing system 160 may include a map configuration subsystem 163 that manages the creation, modification, and maintenance of the content maps used in the routing configuration. The map configuration subsystem 163 may provide interfaces and tools for defining the relationships between service parameters and target devices, allowing administrators to customize the routing behavior for different distributed computing services. This subsystem may also handle the transformation of content maps into efficient data structures (e.g., adjacency lists, hash tables, and/or the like) that can be quickly queried during the routing process. For example, the map configuration subsystem 163 may convert a user-defined content map into an optimized in-memory representation that minimizes lookup times for high-volume traffic scenarios.

In some embodiments, the communication routing system 160 may include a traffic routing subsystem 164 that executes the core logic for determining the appropriate target devices for incoming traffic requests. The traffic routing subsystem 164 may analyze the content of each request, extract relevant service parameters, and use the content maps to identify the most suitable target device or set of devices to handle the request. This subsystem may implement various algorithms and heuristics to balance factors such as load distribution, network latency, and service affinity when making routing decisions. For instance, the traffic routing subsystem 164 may use a combination of content-based rules and real-time load metrics to dynamically adjust routing decisions and optimize overall system performance.

In some embodiments, the communication routing system 160 may include an authorization subsystem 165 that works in conjunction with the access control authority 155 to enforce security policies and access controls within the routing system. The authorization subsystem 165 may validate user permissions for administrative actions, ensure that incoming traffic requests have the necessary credentials to access specific services, and implement any required encryption or secure communication protocols. This subsystem may play a crucial role in maintaining the security and integrity of the content-based routing system, particularly when dealing with sensitive data or regulated environments. For example, the authorization subsystem 165 may implement fine-grained access controls that restrict certain users or applications to specific subsets of the available computing resources based on their security clearance or data sensitivity requirements.

In some embodiments, the system 100 may include a repository 170 that serves as a centralized storage and management system for various data elements used in the content-based communication routing process. The repository 170 may store configuration data, content maps, historical traffic information, system logs, and other relevant information used by the different components of the system. The repository 170 may be implemented using various database technologies (e.g., relational databases, NoSQL databases, distributed file systems, and/or the like) to provide efficient storage, retrieval, and querying capabilities for the large volumes of data involved in managing a distributed routing system. For instance, the repository 170 may use a combination of in-memory caching and persistent storage to provide fast access to frequently used routing configuration data while ensuring long-term data durability and consistency.

Figure 2:
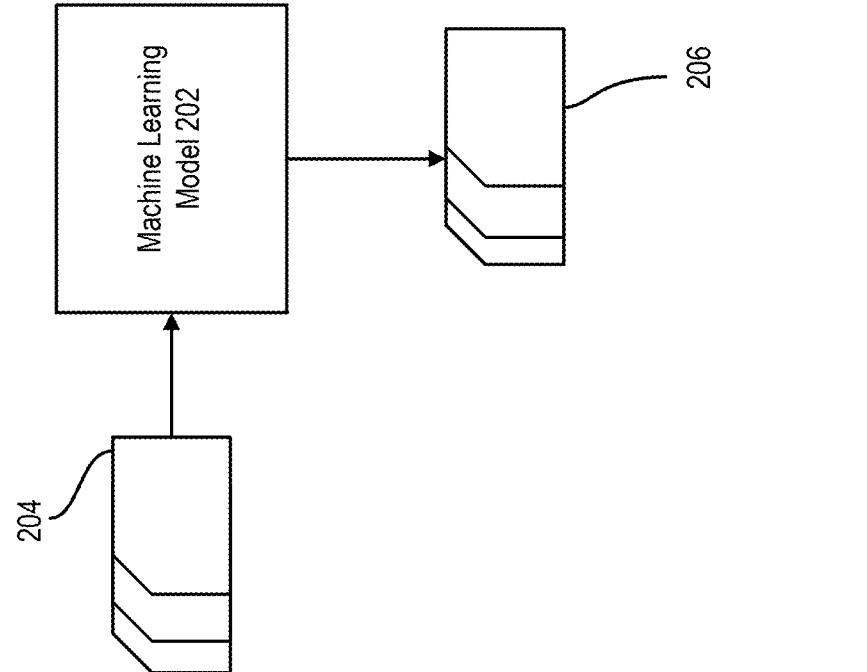
FIG. 2 illustrates an exemplary machine learning model trained to predict candidate target computing devices for traffic request service parameters, in accordance with one or more embodiments of this disclosure.

FIG. 2 illustrates an exemplary machine learning model 202 trained to predict candidate target computing devices for traffic request service parameters, in accordance with one or more embodiments of this disclosure. The machine learning model 202 may be configured to process input 204 related to network traffic and generate output 206 comprising routing targets (e.g., computing devices 132). The machine learning model 202 may be implemented using various machine learning techniques (e.g., neural networks, decision trees, random forests, support vector machines, and/or the like).

The input 204 to the machine learning model 202 may include a wide range of data related to network traffic and system performance. This input data may include, but is not limited to, service parameters associated with incoming traffic requests (e.g., user identifiers, device types, transaction types, content types, and/or the like), current load conditions of target computing devices (e.g., central processing unit (CPU) usage, memory usage, network bandwidth utilization, and/or the like), historical performance data (e.g., response times, error rates, throughput metrics, and/or the like), and network topology information (e.g., data center locations, network latency measurements, available bandwidth between nodes, and/or the like). The machine learning model 202 may be designed to process this diverse set of inputs and extract relevant features for making routing decisions.

The output 206 generated by the machine learning model 202 may include various types of routing-related information. For example, the machine learning model 202 may be specifically designed to handle scenarios where incoming traffic requests contain combinations of service parameters that do not exist within the currently installed content maps of the routing configuration. When such a scenario is encountered, the system 100 may extract the relevant service parameters from the incoming traffic request and provide them as input to the machine learning model 202. The model may then analyze these parameters in conjunction with other relevant data (e.g., current system state, historical performance patterns, and/or the like) to determine a set of candidate target computing devices that are most suitable for handling the request.

The process of determining candidate target computing devices using the machine learning model 202 may involve several operations. First, the model may perform feature extraction on the input data, identifying key characteristics that are most relevant for making routing decisions. This may involve techniques such as dimensionality reduction (e.g., principal component analysis, t-SNE, and/or the like) to focus on the most informative aspects of the data. Next, the model may apply learned patterns and relationships to predict which target devices are likely to perform well given the specific combination of service parameters. This prediction may be based on similarities to previously encountered scenarios, generalized rules learned from the training data, or a combination of multiple factors.

In some embodiments, the output 206 of the machine learning model 202 for determining candidate target devices may include a probability distribution over all available target devices. Each probability value may represent the model's confidence that a particular device is suitable for handling the incoming request. The system 100 may then use this probability distribution to select one or more candidate devices, potentially applying additional criteria (e.g., load balancing considerations, geographic preferences, and/or the like) to make the final selection.

Once the machine learning model 202 has determined a set of candidate target computing devices for a new combination of service parameters, the system 100 may generate a new content map to incorporate this information. The new content map may establish a mapping between the previously unknown combination of service parameters and the selected candidate target devices. This process may involve creating new entries in the routing configuration data structure (e.g., adding nodes to an adjacency list, updating hash tables, and/or the like) to reflect the newly learned routing information.

In some embodiments, the system 100 may employ an iterative process to refine and update the machine learning model 202 over time. This may involve collecting feedback on the performance of routing decisions made based on the model's output (e.g., measuring actual response times, error rates, user satisfaction metrics, and/or the like). The system may use this feedback to generate new training data, allowing the model to continuously learn and adapt to changing network conditions and traffic patterns. The model update process may involve techniques such as online learning, transfer learning, or periodic retraining on accumulated data to ensure that the model remains accurate and effective in making routing decisions.

One or more neurons of the neural network may require that their respective errors are sent backward through the neural network to facilitate the update process (e.g., back-propagation of error). Updates to the connection weights may, for example, be reflective of the magnitude of error propagated backward after a forward pass has been completed. In this way, for example, the machine learning model may be trained to generate better predictions for whether an API usage condition exists, what type of API usage condition it is, the severity, or which API is affected.

In some embodiments, the machine learning model 202 may include an artificial neural network. In such embodiments, the machine learning model 202 may include an input layer and one or more hidden layers. Each neural unit of the machine learning model 202 may be connected to one or more other neural units of the machine learning model 202. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model 202 may be self-learning or trained rather than explicitly programmed and may perform significantly better in certain areas of problem-solving as compared to computer programs that do not use machine learning. During training, an output layer of the machine learning model 202 may correspond to a classification of the machine learning model 202, and an input known to correspond to that classification may be input into an input layer of the machine learning model 202 during training. During testing, an input without a known classification may be input into the input layer, and a determined classification may be output.

The machine learning model 202 may include embedding layers in which each feature of a vector is converted into a dense vector representation. These dense vector representations for each feature may be pooled at one or more subsequent layers to convert the set of embedding vectors into a single vector. The machine learning model 202 may be structured as a factorization machine model. The machine learning model 202 may be a non-linear model or supervised learning model that can perform classification or regression. For example, the machine learning model 202 may be a general-purpose supervised learning algorithm that the communication routing system 160 uses for both classification and regression tasks. Alternatively, the machine learning model 202 may include a Bayesian model configured to perform variational inference on the graph or vector.

Transformer for Neural Network

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks, and there may be more complex neural network designs that include feedback connections, skip connections, or other such possible connections between neurons or layers, which are not discussed in detail here.

A deep neural network (DNN) is a type of neural network having multiple layers or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "machine learning-based model" or more simply "machine learning model" may be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), or may encompass another domain or domains, be they larger or smaller than a single language or subject domain. For example, a relatively large, multilingual, and non-subject-specific corpus can be created by extracting text from online webpages or publicly available social media posts. Training data can be annotated with ground truth labels (e.g., each data entry in the training dataset can be paired with a label) or may be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding machine learning model input (e.g., in the case of an autoencoder), or can be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during machine learning model training. For example, the training set may be first used to train one or more machine learning models, each machine learning model, e.g., having a particular architecture, having a particular training procedure, being describable by a set of model hyperparameters, or otherwise being varied from the other of the one or more machine learning models. The validation (or cross-validation) set may then be used as input data into the trained machine learning models to, e.g., measure the performance of the trained machine learning models or compare performance between them. Where hyperparameters are used, a new set of hyperparameters can be determined based on the measured performance of one or more of the trained machine learning models, and the first step of training (e.g., with the training set) may begin again on a different machine learning model described by the new set of determined hyperparameters. In this way, these steps can be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) may begin. The output generated from the testing set may be compared with the corresponding desired target values to give a final assessment of the trained machine learning model's accuracy. Other segmentations of the larger data set or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model can be used. The process of updating (or learning) the parameters over many iterations is referred to as training. Training may be carried out iteratively until a convergence condition is met (e.g., a predefined maximum number of iterations has been performed or the value outputted by the machine learning model is sufficiently converged with the desired target value), after which the machine learning model is considered to be sufficiently trained. The values of the learned parameters can then be fixed and the machine learning model may be deployed to generate output in real-world applications (also referred to as "inference").

In some examples, a trained machine learning model may be fine-tuned, meaning that the values of the learned parameters may be adjusted slightly in order for the machine learning model to better model a specific task. Fine-tuning of a machine learning model typically involves further training the machine learning model on a number of data samples (which may be smaller in number/cardinality than those used to train the model initially) that closely target the specific task. For example, a machine learning model for generating natural language, e.g., for alerts to operators, or commands that has been trained generically on publicly available text corpora may be, e.g., fine-tuned by further training using specific training samples. The specific training samples can be used to generate language in a certain style or in a certain format. For example, the machine learning model can be trained to generate a blog post having a particular style and structure with a given topic.

Some concepts in machine learning-based language models are now discussed. It may be noted that, while the term "language model" has been commonly used to refer to a machine learning-based language model, there could exist non-machine learning language models. In the present disclosure, the term "language model" can refer to a machine learning-based language model (e.g., a language model that is implemented using a neural network or other machine learning architecture) unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any machine learning-based language model, including language models based on other neural network architectures such as RNN-based language models.

FIG. 3 illustrates an example table representing a routing configuration for a load balancing device, in accordance with one or more embodiments of this disclosure. The system may include a routing configuration 300 (e.g., a data structure, a database table, a configuration file, and/or the like) that stores information for managing content-based routing between different computing environments. The routing configuration 300 may be structured to include multiple columns that represent different aspects of the routing information. These columns may include mappable service parameters 302 (e.g., user identifiers, location data, transaction types, product categories, subscription tiers, device types, query parameters, language preferences, content types, and/or the like), target device identifiers 304 (e.g., unique identifiers for computing devices that can process incoming requests), data center identifiers 306 (e.g., codes or names representing specific data centers where target devices are located), and data center environment designations 308 (e.g., indicators specifying whether a data center is part of an on-premises or cloud-based environment).

As shown, the routing configuration 300 may include one or more content maps (e.g., first content map 310A, second content map 310B, and/or the like) that define the relationships between incoming request parameters and the appropriate target devices for processing those requests. A content map may be a structured representation of routing rules that associates specific combinations of service parameters with designated target devices and data centers. For example, the first content map 310A may contain entries related to combinations of service parameters for a first distributed computing service, while the second content map 310B may contain entries related to combinations of service parameters for a second distributed computing service. Each row in a content map may represent a distinct routing rule that maps particular service parameters to specific target devices and data centers.

In some embodiments, the system may receive a user request via a graphical user interface (e.g., a web-based portal, a desktop application, a mobile app, and/or the like) to add a second distributed computing service to be load balanced using a load balancing device (e.g., load balancing device 166). The user request may include an indication of a second content map (e.g., second content map 310B) for the second distributed computing service. This second content map may map one or more second service parameters within incoming traffic requests for the second distributed computing service to one or more second target devices within a second subset of computing devices of a set of computing devices. For instance, the second content map 310B may include mappable service parameters 302 such as DEVICE_TYPE, DURATION, QUERY_PARAMS, LANGUAGE, and CONTENT_TYPE, which are mapped to target devices C004-C006 and data centers DC0003-DC0005.

In some embodiments, the system may configure the load balancing device to transmit incoming traffic requests associated with a select distributed computing service to computing devices that are mapped to service parameters of the incoming traffic requests. This mapping may be stored in the routing configuration 300 in the form of content maps (e.g., first content map 310A, second content map 310B). The configuration process may involve updating the routing configuration 300 to include the new content map and establishing the necessary connections and rules within the load balancing device to properly route incoming requests based on the newly added service parameters and target devices.

In some embodiments, the system may determine a target computing device using the content map within the routing configuration 300. This determination process may involve analyzing the incoming traffic request to identify relevant service parameters, then using these parameters to search the appropriate content map for a matching entry. For example, if an incoming request contains service parameters that match those in the second content map 310B, the system may identify the corresponding target device (e.g., C004, C005, or C006) and data center (e.g., DC0003, DC0004, or DC0005) for routing the request.

In some embodiments, the system may extract a subset of service parameters used to properly identify which distributed computing service is associated with the incoming traffic request. This extraction process may involve parsing the incoming request data to isolate specific parameters (e.g., DEVICE_TYPE, DURATION, QUERY_PARAMS) that are relevant for routing decisions. The system may use predefined rules or algorithms to determine which parameters are pertinent for identifying the appropriate distributed computing service.

In some embodiments, the system may compare the subset of service parameters with mapped service parameters within the content map. This comparison process may involve iterating through the entries in the relevant content map (e.g., second content map 310B) and checking for matches between the extracted subset of service parameters and the mappable service parameters 302 stored in the content map. The comparison may use exact matching, pattern matching, or other comparison techniques to identify the most appropriate routing rule.

In some embodiments, the system may extract a mapping between variable composites of mappable service parameters (e.g., combinations of service parameters) and target computing devices from the content map. This extraction process may involve analyzing the structure of the content map to identify how different combinations of service parameters are associated with specific target devices. For example, in the second content map 310B, a combination of DEVICE_TYPE, DURATION, and LANGUAGE parameters may be mapped to a particular target device (e.g., C005) within a specific data center (e.g., DC0004).

In some embodiments, the system may include a configuration generation engine (e.g., a software module, a set of algorithms, a processing component, and/or the like) that processes user input from the portal or API and translates it into valid NGINX configuration files. This engine may take the information provided in the user request, such as the details of the second content map 310B, and generate the necessary NGINX configuration syntax to implement the routing rules. The configuration generation process may involve creating location blocks, upstream server definitions, and other NGINX-specific directives that reflect the mapping between service parameters and target devices.

In some embodiments, the system may support dynamic updates where NGINX configuration is auto-updated with no manual intervention. This feature may allow for real-time modifications to the routing configuration 300 and its associated content maps without requiring a restart of the NGINX server or manual editing of configuration files. For example, if a new target device is added to the second content map 310B, the system may automatically generate the necessary NGINX configuration updates and apply them to the running server, ensuring that subsequent incoming requests can be routed to the new device without any service interruption.

In some embodiments, the system may support vanity mapping where applications have dedicated hosts to meet app-level isolation and drain requirements. This feature may be reflected in the routing configuration 300 by associating specific target devices or data centers with particular applications or services. For instance, in the first content map 310A, certain combinations of USER_ID and LOCATION parameters may be mapped to dedicated target devices (e.g., C001) to ensure isolation for specific high-priority or sensitive applications. The vanity mapping functionality may allow for fine-grained control over how incoming requests are routed, enabling administrators to implement application-specific routing policies and isolation requirements within the broader content-based routing framework.

Figure 4:
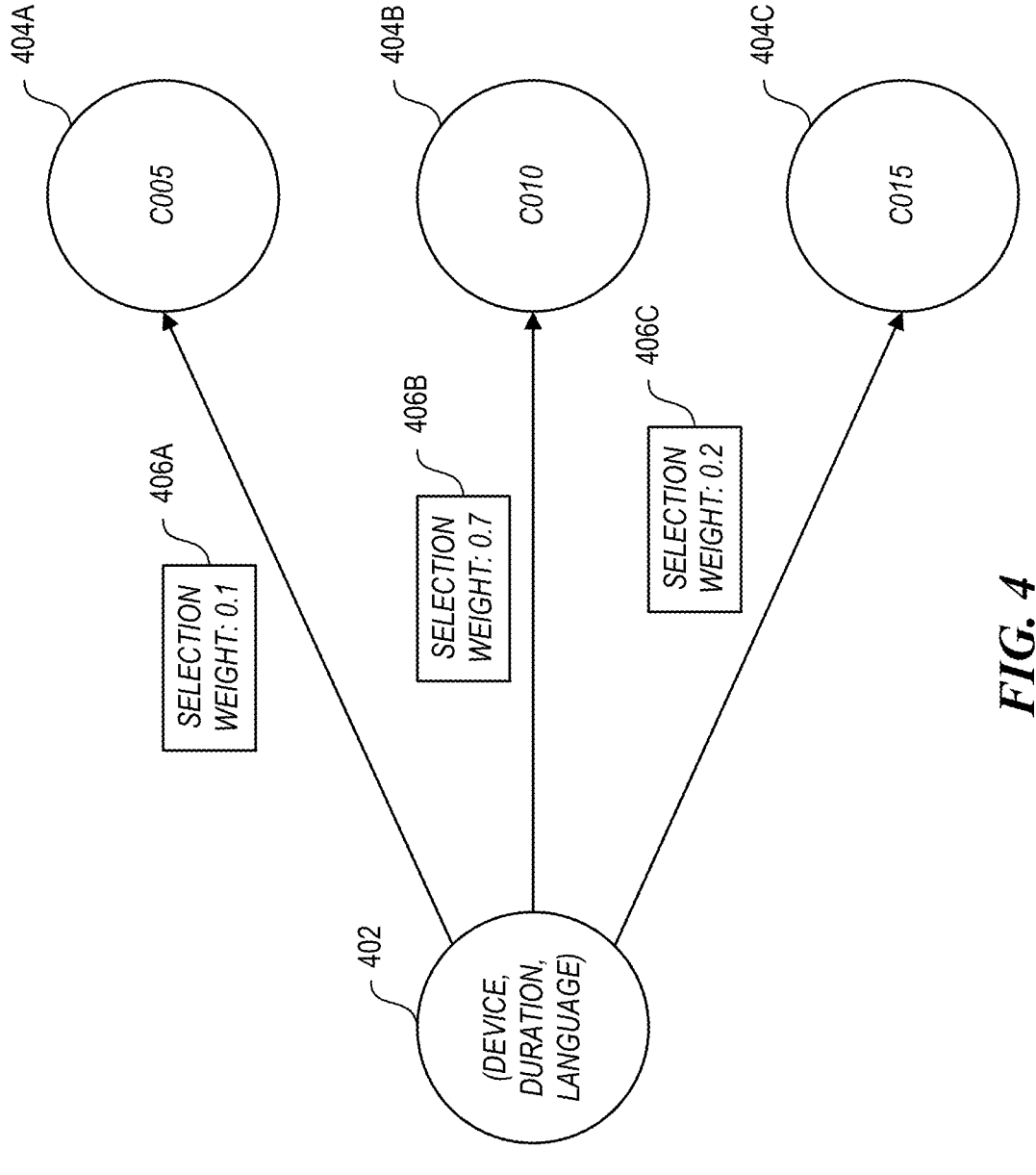
FIG. 4 illustrates an example table representing an adjacency data structure for a routing configuration of a load balancing device, in accordance with one or more embodiments of this disclosure.

FIG. 4 illustrates an example table representing an adjacency data structure for a routing configuration of a load balancing device, in accordance with one or more embodiments of this disclosure. The system may transform and/or represent a content map into an adjacency data structure 400 comprising a plurality of nodes and a plurality of links. The adjacency data structure 400 (e.g., a graph-based data structure, a network topology representation, and/or the like) may be utilized for routing network traffic based on specific service parameters. The adjacency data structure 400 may include a service parameter node 402 (e.g., a node representing a combination of device, duration, and language parameters, a node encoding multiple service attributes, and/or the like) that is connected to multiple target device nodes through weighted connections. The service parameter node 402 may represent a combination of service parameters (e.g., parameters associated with a distributed computing service, attributes of an incoming traffic request, and/or the like) that are used to determine appropriate routing for network traffic.

In some embodiments, the adjacency data structure 400 may include multiple target device nodes, each representing a potential destination for routing network traffic. The adjacency data structure 400 may include a target device node 404A labeled C005, a target device node 404B labeled C010, and a target device node 404C labeled C015. Each of these target device nodes (e.g., node 404A, node 404B, node 404C, and/or the like) may correspond to a specific computing device or server within a data center that is capable of processing incoming traffic requests. The labeling of these nodes (e.g., C005, C010, C015, and/or the like) may provide a unique identifier for each target device, allowing for precise routing decisions based on the service parameters associated with incoming traffic.

In some embodiments, the system may retrieve a set of load servicing ratings indicating capacity for each target computing device represented by the target device nodes in the adjacency data structure 400. The load servicing ratings (e.g., processing capacity, available memory, current network load, and/or the like) may provide information about the ability of each target device to handle incoming traffic requests. This information may be crucial for making informed routing decisions and ensuring efficient distribution of network traffic across available resources. The system may periodically update these load servicing ratings to reflect changes in the capacity or performance of the target devices, allowing for dynamic adjustment of routing strategies based on current conditions.

In some embodiments, the system may update the adjacency data structure 400 to add a selection weight to each link between the service parameter node 402 and the target device nodes (e.g., nodes 404A, 404B, 404C, and/or the like). The selection weights (e.g., numerical values representing routing priorities, percentages indicating traffic distribution, and/or the like) may determine the routing priority for network traffic between the service parameter node 402 and the respective target device nodes. For example, the adjacency data structure 400 may include a selection weight 406A with a value of 0.1 for the connection to target device node 404A, a selection weight 406B with a value of 0.7 for the connection to target device node 404B, and a selection weight 406C with a value of 0.2 for the connection to target device node 404C. These selection weights may be used to distribute incoming traffic across multiple target devices based on their current capacity and performance characteristics.

In some embodiments, the system may retrieve modified load servicing ratings for monitored target computing devices represented in the adjacency data structure 400. The modified load servicing ratings (e.g., updated processing capacity, changes in available memory, fluctuations in network load, and/or the like) may reflect changes in the performance or capacity of specific target devices over time. For example, if a target device experiences a sudden increase in processing load or a decrease in available resources, its load servicing rating may be adjusted accordingly. The system may continuously monitor these ratings to ensure that routing decisions are based on the most current information about the state of each target device.

In some embodiments, the system may update the selection weight of links within the adjacency data structure 400 based on the modified load servicing ratings. This updating process may involve recalculating the selection weights for each link between the service parameter node 402 and the target device nodes (e.g., nodes 404A, 404B, 404C, and/or the like) to reflect changes in the capacity or performance of the target devices. For instance, if the load servicing rating for the target device represented by node 404A increases, the system may adjust the selection weight 406A to a higher value, potentially increasing the likelihood of routing traffic to that device. Conversely, if the load servicing rating for the target device represented by node 404B decreases, the system may reduce the selection weight 406B, potentially decreasing the amount of traffic routed to that device. This dynamic adjustment of selection weights may ensure that network traffic is distributed optimally across available resources based on current conditions and capacities.

Figure 5:
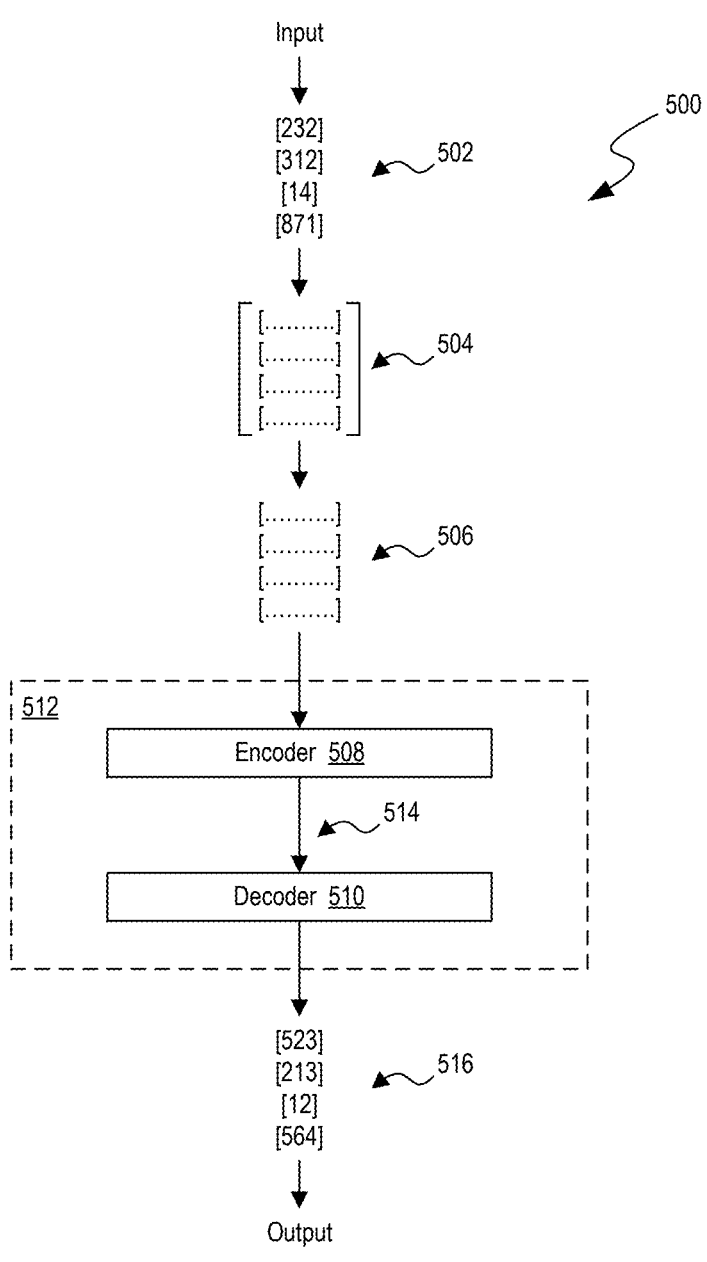
FIG. 5 is a block diagram of an example transformer used to predict candidate target computing devices for traffic request service parameters, in accordance with one or more embodiments of this disclosure.

FIG. 5 is an example 500 of how the transformer 512 can process textual input data. Input to a language model (whether transformer based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

As shown in the example 500, a short sequence of tokens 502 corresponding to the input text is illustrated as input to the transformer 512. Tokenization of the text sequence into the tokens 502 can be performed by some pre-processing tokenization module such as, for example, a byte-pair encoding tokenizer (the "pre" referring to the tokenization occurring prior to the processing of the tokenized input by the LLM), which is not shown in FIG. 5 for brevity. In general, the token sequence that is inputted to the transformer 512 can be of any length up to a maximum length defined based on the dimensions of the transformer 512. Each token 502 in the token sequence is converted into an embedding 506 (also referred to as an "embedding vector").

An embedding 506 is a learned numerical representation (such as, for example, a vector) of a token that captures some semantic meaning of the text segment represented by the token 502. The embedding 506 represents the text segment corresponding to the token 502 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 506 corresponding to the "write" token will be closer to another embedding corresponding to the "jot down" token in the vector space as compared to the distance between the embedding 506 corresponding to the "write" token and another embedding corresponding to the "summary" token.

The vector space can be defined by the dimensions and values of the embedding vectors. Various techniques can be used to convert a token 502 to an embedding 506. For example, another trained machine learning model can be used to convert the token 502 into an embedding 506. In particular, another trained machine learning model can be used to convert the token 502 into an embedding 506 in a way that encodes additional information into the embedding 506 (e.g., a trained machine learning model can encode positional information about the position of the token 502 in the text sequence into the embedding 506). In some implementations, the numerical value of the token 502 can be used to look up the corresponding embedding in an embedding matrix 504, which can be learned during training of the transformer 512.

The generated embeddings, e.g., such as the embedding 506, are input into the encoder 508. The encoder 508 serves to encode the embedding 506 into feature vectors 514 that represent the latent features of the embedding 506. The encoder 508 can encode positional information (i.e., information about the sequence of the input) in the feature vectors 514. The feature vectors 514 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 514 that can be generated by the encoder 508 can be referred to as a latent space or feature space.

Conceptually, the decoder 510 is designed to map the features represented by the feature vectors 514 into meaningful output, which can depend on the task that was assigned to the transformer 512. For example, if the transformer 512 is used for a translation task, the decoder 510 can map the feature vectors 514 into text output in a target language different from the language of the original tokens 502. Generally, in a generative language model, the decoder 510 serves to decode the feature vectors 514 into a sequence of tokens. The decoder 510 can generate output tokens 516 one by one. Each output token 516 can be fed back as input to the decoder 510 in order to generate the next output token 516. By feeding back the generated output and applying self-attention, the decoder 510 can generate a sequence of output tokens 516 that has sequential meaning (e.g., the resulting output text sequence is understandable as a sentence and obeys grammatical rules). The decoder 510 can generate output tokens 516 until a special [EOT] token (indicating the end of the text) is generated. The resulting sequence of output tokens 516 can then be converted to a text sequence in post-processing. For example, each output token 516 can be an integer number that corresponds to a vocabulary index. By looking up the text segment using the vocabulary index, the text segment corresponding to each output token 516 can be retrieved, the text segments can be concatenated together, and the final output text sequence can be obtained.

In some implementations, the input provided to the transformer 512 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or check-boxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive or can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

Figure 6:
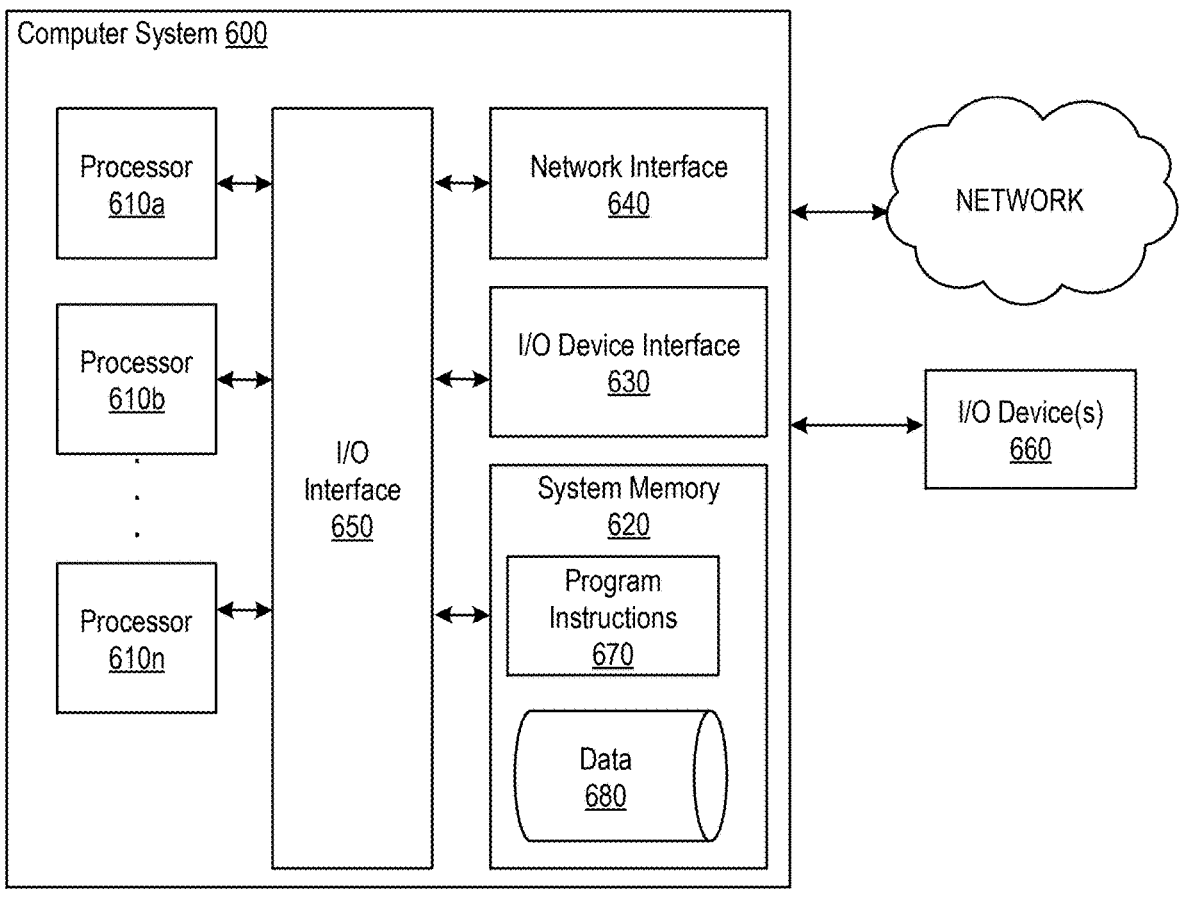
FIG. 6 illustrates an example computing system that may be used in accordance with some embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 620). Computing system 600 may be a uniprocessor system including one processor (e.g., processor 610a), or a multiprocessor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

The I/O device interface 630 and I/O devices 660 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, or the like. Alternatively or additionally, the user may use their voice to indicate specific nodes, specific models, or the like via the voice recognition device or microphones.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the internet, a LAN, a WAN, a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device or a plurality of memory devices (e.g., distributed memory devices).

I/O interface 650 may be configured to coordinate I/O traffic between processors 610a-610n, system memory 620, network interface 640, I/O devices 660, or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

FIG. 7 is a flowchart 700 of operations for monitoring, configuring, and routing incoming traffic requests, in accordance with one or more embodiments of this disclosure. In one example, the system includes at least one hardware processor and at least one non-transitory memory storing instructions, which, when executed by the at least one hardware processor, cause the system to perform the operations of flowchart 700. In another example, the system includes a non-transitory, computer-readable storage medium comprising instructions recorded thereon, which, when executed by at least one data processor, cause the system to perform the operations of flowchart 700. The operations of FIG. 7 may use components described in relation to FIG. 6. In some embodiments, the communication routing system 160 may include one or more components of computer system 600.

At operation 702, one or more of processors 610a-610n may monitor (e.g., at a load balancing device) real-time network traffic data that is communicated to one or more distributed computing services. The one or more distributed computing services may be hosted on a set of computing devices distributed among two or more data centers. In some examples, the incoming traffic requests within the real-time network traffic data may be transmitted (e.g., by the load balancing device) to one or more computing devices of the set of computing devices based on a routing configuration of the load balancing device. In some examples, the routing configuration may include a first content map for a first distributed computing service. In some examples, the first content map may link one or more first service parameters within the incoming traffic requests for the first distributed computing service to one or more first target devices within a first subset of computing devices of the set of computing devices.

At operation 704, one or more of processors 610a-610n may receive (e.g., via a graphical user interface) a user request to add a second distributed computing service to be load balanced using the load balancing device. In some examples, the user request may include an indication of a second content map for the second distributed computing service. In some examples, the second content map may link one or more second service parameters within the incoming traffic requests for the second distributed computing service to one or more second target devices within a second subset of computing devices of the set of computing devices. In some examples, the second subset of computing devices may be distributed, in part, among a first data center corresponding to a cloud-based computing environment and a second data center corresponding to an on-premises computing environment.

At operation 706, one or more of processors 610a-610n may configure the load balancing device to transmit the incoming traffic requests associated with the second distributed computing service to computing devices within either the first data center or the second data center in response to receiving the user request. In some examples, the one or more of processors 610a-610n may configure the load balancing device by adding the second content map to the routing configuration of the load balancing device.

In some examples, the one or more of processors 610a-610n may transform the second content map into an adjacency data structure that includes a plurality of nodes and a plurality of links. The one or more of processors 610a-610n may extract (e.g., from the second content map of the user request) a mapping between one or more variable composites of mappable service parameters and one or more target computing devices within the second subset of computing devices. In some examples, the mappable service parameters are associated with the incoming traffic requests for the second distributed computing service. The one or more of processors 610a-610n may generate a first set of nodes corresponding to the one or more variable composites of the mappable service parameters. The one or more of processors 610a-610n may generate a second set of nodes corresponding to the one or more target computing devices within the second subset of computing devices. The one or more of processors 610a-610n may generate the adjacency data structure by linking the first set of nodes to the second set of nodes. In some examples, each node in the first set of nodes may include a link to at least one node in the second set of nodes that is based on the mapping between the one or more variable composites of the mappable service parameters and the one or more target computing devices.

In some examples, the one or more of processors 610a-610n may retrieve (e.g., from the one or more target computing devices) a set of load servicing ratings indicating capacity for each target computing device within the one or more target computing devices to service the incoming traffic requests for the second distributed computing service. The one or more of processors 610a-610n may update, based on the set of load servicing ratings, the adjacency data structure to add a selection weight to each link between the first set of nodes and the second set of nodes. In some examples, the selection weight for the link between a first node within the first set of nodes and a second node within the second set of nodes may indicate a degree of priority for transmitting the incoming traffic requests with a variable composite of the mappable service parameters corresponding the first node to the target computing device corresponding to the second node.

In some examples, the one or more of processors 610a-610n may retrieve one or more modified load servicing ratings for the at least one monitored target computing device from at least one monitored target computing device within the second subset of computing devices. The one or more of processors 610a-610n may determine, from the adjacency data structure, a set of links corresponding to the at least one monitored target computing device. The one or more of processors 610a-610n may update the selection weight of each link within the set of links based on the one or more modified load servicing ratings.

In some examples, the one or more of processors 610a-610n may determine that installation of the second content map at the load balancing device requires one or more operating permissions that are not assigned to a user associated with the user request. The one or more of processors 610a-610n may determine at least one access control authority that assigns the one or more operating permissions to one or more users of the load balancing device. The one or more of processors 610a-610n may transmit (e.g., to the at least one access control authority) a message that requests assignment of the one or more operating permissions to the user associated with the user request. In some examples, the message may include one or more mappable service parameters of the second content map and one or more target computing devices of the second content map. The one or more of processors 610a-610n may pause addition of the second content map until the one or more operating permissions are received, where a status of the addition of the second content map is stored.

At operation 708, one or more of processors 610a-610n may receive (e.g., from the real-time network traffic data) an incoming traffic request comprising a set of service parameters associated with the one or more distributed computing services hosted on the set of computing devices. At operation 710, one or more of processors 610a-610n may determine the incoming traffic request corresponds to the second distributed computing service based on the set of service parameters.

At operation 712, one or more of processors 610a-610n may determine (e.g., using the second content map within the routing configuration and from the second subset of computing devices) a target computing device that is mapped, by the second content map, to the set of service parameters for the incoming traffic request. In some examples, the one or more of processors 610a-610n may determine the target computing device in response to determining that the incoming traffic request corresponds to the second distributed computing service. In some examples, the target computing device may be within either the first data center or the second data center. At operation 714, one or more of processors 610a-610n may transmit the incoming traffic request to the target computing device.

In some examples, the one or more of processors 610a-610n may extract, from the set of service parameters, a subset of service parameters corresponding to the second distributed computing service. The one or more of processors 610a-610n may compare (e.g., by the load balancing device) the subset of service parameters with mapped service parameters within the second content map. The one or more of processors 610a-610n may identify a subset of the mapped service parameters that match the subset of service parameters based on comparing the subset of service parameters. The one or more of processors 610a-610n may determine a target device within the second subset of computing devices based on the subset of the mapped service parameters of the second content map.

In some examples, the one or more of processors 610a-610n may determine (e.g., from the set of service parameters for a new incoming traffic request) a combination of service parameters that does not exist within an installed content map of the routing configuration. The one or more of processors 610a-610n may input the combination of service parameters into a machine learning model to determine, from the installed content map, a set of candidate target computing devices for servicing the new incoming traffic request associated with the combination of service parameters. The one or more of processors 610a-610n may generate a new content map that maps the combination of service parameters to one or more candidate target computing devices within the set of candidate target computing devices.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology not only may include additional elements to those embodiments noted above but also may include fewer elements.

These and other changes can be made to the technology in light of the above Detailed Description. While the above description describes certain examples of the technology and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

What is claimed is:

1. A system for routing network traffic of one or more distributed computing services based on contents of the network traffic, the system comprising:

one or more processors; and one or more non-transitory, computer-readable storage media storing instructions, which, when executed by the one or more processors, cause the one or more processors to perform operations comprising:

monitoring, at a load balancing device, real-time net-
work traffic data that is communicated to the one or
more distributed computing services hosted on a set
of computing devices distributed among two or more
data centers, wherein incoming traffic requests
within the real-time network traffic data are trans-
mitted, by the load balancing device, to one or more
computing devices of the set of computing devices
based on a routing configuration of the load balanc-
ing device, the routing configuration comprising a
first content map for a first distributed computing
service, wherein the first content map maps one or
more first service parameters within the incoming
traffic requests for the first distributed computing
service to one or more first target devices within a
first subset of computing devices of the set of com-
puting devices;

receiving, via a graphical user interface, a user request
to add a second distributed computing service to be
load balanced using the load balancing device,
wherein the user request comprises an indication of
a second content map for the second distributed
computing service, wherein the second content map
maps one or more second service parameters within
the incoming traffic requests for the second distrib-
uted computing service to one or more second target
devices within a second subset of computing devices
of the set of computing devices, and wherein the
second subset of computing devices is distributed, in
part, among a first data center corresponding to a
cloud-based computing environment and a second
data center corresponding to an on-premises com-
puting environment;

responsive to receiving the user request, configuring
the load balancing device to transmit the incoming
traffic requests associated with the second distributed
computing service to computing devices within
either the first data center or the second data center
by adding the second content map to the routing
configuration of the load balancing device;

receiving, from the real-time network traffic data, an
incoming traffic request comprising a set of service
parameters associated with the one or more distrib-
uted computing services hosted on the set of com-
puting devices;

determining, based on the set of service parameters, the
incoming traffic request corresponds to the second
distributed computing service;

responsive to determining that the incoming traffic
request corresponds to the second distributed com-
puting service, determining, using the second con-
tent map within the routing configuration and from
the second subset of computing devices, a target
computing device that is mapped, by the second
content map, to the set of service parameters for the
incoming traffic request, wherein the target comput-
ing device is within either the first data center or the
second data center; and transmitting the incoming traffic request to the target
computing device.

2. The system of claim 1, wherein the instructions further
cause the one or more processors to perform operations
comprising:

extracting, from the set of service parameters, a subset of
service parameters corresponding to the second distrib-
uted computing service;

comparing, by the load balancing device, the subset of
service parameters with mapped service parameters
within the second content map;

identifying, based on comparing the subset of service
parameters, a subset of the mapped service parameters
that match the subset of service parameters; and determining, based on the subset of the mapped service
parameters of the second content map, a target device
within the second subset of computing devices.

3. The system of claim 1, where the instructions for
adding the second content map to the routing configuration
of the load balancing device further cause the one or more
processors to perform operations comprising:

transforming the second content map into an adjacency
data structure that comprises a plurality of nodes and a
plurality of links.

4. The system of claim 3, wherein the instructions for
transforming the second content map into the adjacency data
structure further cause the one or more processors to per-
form operations comprising:

extracting, from the second content map of the user
request, a mapping between one or more variable
composites of mappable service parameters and one or
more target computing devices within the second sub-
set of computing devices, wherein the mappable ser-
vice parameters are associated with the incoming traffic
requests for the second distributed computing service;

generating a first set of nodes corresponding to the one or
more variable composites of the mappable service
parameters;

generating a second set of nodes corresponding to the one
or more target computing devices within the second
subset of computing devices; and generating the adjacency data structure by linking the first
set of nodes to the second set of nodes, wherein each
node in the first set of nodes comprises a link to at least
one node in the second set of nodes that is based on the
mapping between the one or more variable composites
of the mappable service parameters and the one or more
target computing devices.

5. The system of claim 4, wherein the instructions further
cause the one or more processors to perform operations
comprising:

retrieving, from the one or more target computing
devices, a set of load servicing ratings indicating capac-
ity for each target computing device within the one or
more target computing devices to service the incoming
traffic requests for the second distributed computing
service; and updating, based on the set of load servicing ratings, the
adjacency data structure to add a selection weight to
each link between the first set of nodes and the second
set of nodes, wherein the selection weight for the link
between a first node within the first set of nodes and a
second node within the second set of nodes indicates a
degree of priority for transmitting the incoming traffic
requests with a variable composite of the mappable
service parameters corresponding to the first node to
the target computing device corresponding to the sec-
ond node.

6. The system of claim 5, wherein the instructions further
cause the one or more processors to perform operations
comprising:

retrieving, from at least one monitored target computing
device within the second subset of computing devices,
one or more modified load servicing ratings for the at
least one monitored target computing device;

determining, from the adjacency data structure, a set of links corresponding to the at least one monitored target computing device; and updating, based on the one or more modified load servicing ratings, the selection weight of each link within the set of links.

7. The system of claim 1, wherein the instructions for determining the target computing device further cause the one or more processors to perform operations comprising:

determining, from the set of service parameters for a new incoming traffic request, a combination of service parameters that does not exist within an installed content map of the routing configuration;

inputting the combination of service parameters into a machine learning model to determine, from the installed content map, a set of candidate target computing devices for servicing the new incoming traffic request associated with the combination of service parameters; and generating a new content map that maps the combination of service parameters to one or more candidate target computing devices within the set of candidate target computing devices.

8. The system of claim 1, wherein the instructions further cause the one or more processors to perform operations comprising:

determining that installation of the second content map at the load balancing device requires one or more operating permissions that are not assigned to a user associated with the user request;

determining at least one access control authority that assigns the one or more operating permissions to one or more users of the load balancing device;

transmitting, to the at least one access control authority, a message that requests assignment of the one or more operating permissions to the user associated with the user request, wherein the message comprises one or more mappable service parameters of the second content map and one or more target computing devices of the second content map; and pausing addition of the second content map until the one or more operating permissions are received, wherein a status of the addition of the second content map is stored.

9. A method for routing network traffic, the method comprising:

routing incoming traffic requests using a routing configuration of a load balancing device, wherein the routing configuration comprises a first content map for a first distributed computing service, and wherein the first content map maps one or more first service parameters within the incoming traffic requests for the first distributed computing service to one or more first target devices within a first subset of computing devices of a set of computing devices;

receiving a user request to add a second distributed computing service to be load balanced using the load balancing device, wherein the user request comprises an indication of a second content map for the second distributed computing service, wherein the second content map maps one or more second service parameters within the incoming traffic requests for the second distributed computing service to one or more second target devices within a second subset of computing devices of the set of computing devices;

responsive to receiving the user request, configuring the load balancing device, using the second content map, to transmit the incoming traffic requests associated with the second distributed computing service to computing devices within either a first data center or a second data center;

receiving an incoming traffic request comprising a set of service parameters associated with one or more distributed computing services hosted on the set of computing devices;

determining, based on the set of service parameters, the incoming traffic request corresponds to the second distributed computing service;

responsive to determining that the incoming traffic request corresponds to the second distributed computing service, determining, using the second content map within the routing configuration, a target computing device that is mapped, by the second content map, to the set of service parameters for the incoming traffic request; and transmitting the incoming traffic request to the target computing device.

10. The method of claim 9, further comprising monitoring, at the load balancing device, real-time network traffic data that is communicated to the one or more distributed computing services hosted on the set of computing devices distributed among two or more data centers, wherein the second subset of computing devices is distributed, in part, among the first data center corresponding to a cloud-based computing environment and the second data center corresponding to an on-premises computing environment.

11. The method of claim 9, further comprising:

extracting, from the set of service parameters, a subset of service parameters corresponding to the second distributed computing service;

comparing, by the load balancing device, the subset of service parameters with mapped service parameters within the second content map;

identifying, based on comparing the subset of service parameters, a subset of the mapped service parameters that match the subset of service parameters; and determining, based on the subset of the mapped service parameters of the second content map, a target device within the second subset of computing devices.

12. The method of claim 9, wherein adding the second content map to the routing configuration of the load balancing device further comprises:

transforming the second content map into an adjacency data structure that comprises a plurality of nodes and a plurality of links.

13. The method of claim 12, wherein transforming the second content map into the adjacency data structure further comprises:

extracting, from the second content map of the user request, a mapping between one or more variable composites of mappable service parameters and one or more target computing devices within the second subset of computing devices, wherein the mappable service parameters are associated with the incoming traffic requests for the second distributed computing service;

generating a first set of nodes corresponding to the one or more variable composites of the mappable service parameters;

generating a second set of nodes corresponding to the one or more target computing devices within the second subset of computing devices; and generating the adjacency data structure by linking the first set of nodes to the second set of nodes, wherein each node in the first set of nodes comprises a link to at least one node in the second set of nodes that is based on the mapping between the one or more variable composites of the mappable service parameters and the one or more target computing devices.

14. The method of claim 13, further comprising:

retrieving, from the one or more target computing devices, a set of load servicing ratings indicating capacity for each target computing device within the one or more target computing devices to service the incoming traffic requests for the second distributed computing service; and updating, based on the set of load servicing ratings, the adjacency data structure to add a selection weight to each link between the first set of nodes and the second set of nodes, wherein the selection weight for the link between a first node within the first set of nodes and a second node within the second set of nodes indicates a degree of priority for transmitting the incoming traffic requests with a variable composite of the mappable service parameters corresponding to the first node to the target computing device corresponding to the second node.

15. The method of claim 14, further comprising:

retrieving, from at least one monitored target computing device within the second subset of computing devices, one or more modified load servicing ratings for the at least one monitored target computing device;

determining, from the adjacency data structure, a set of links corresponding to the at least one monitored target computing device; and updating, based on the one or more modified load servicing ratings, the selection weight of each link within the set of links.

16. The method of claim 9, wherein determining the target computing device further comprises:

determining, from the set of service parameters for a new incoming traffic request, a combination of service parameters that does not exist within an installed content map of the routing configuration;

inputting the combination of service parameters into a machine learning model to determine, from the installed content map, a set of candidate target computing devices for servicing the new incoming traffic request associated with the combination of service parameters; and generating a new content map that maps the combination of service parameters to one or more candidate target computing devices within the set of candidate target computing devices.

17. The method of claim 9, further comprising:

determining that installation of the second content map at the load balancing device requires one or more operating permissions that are not assigned to a user associated with the user request;

determining at least one access control authority that assigns the one or more operating permissions to one or more users of the load balancing device;

transmitting, to the at least one access control authority, a message that requests assignment of the one or more operating permissions to the user associated with the user request, wherein the message comprises one or more mappable service parameters of the second content map and one or more target computing devices of the second content map; and pausing addition of the second content map until the one or more operating permissions are received, wherein a status of the addition of the second content map is stored.

18. One or more non-transitory, computer-readable storage media comprising instructions recorded thereon that, when executed by one or more processors, cause operations for routing network traffic, comprising:

routing incoming traffic requests using a routing configuration of a load balancing device, wherein the routing configuration comprises a first content map for a first distributed computing service, and wherein the first content map maps one or more first service parameters within the incoming traffic requests for the first distributed computing service to one or more first target devices within a first subset of computing devices of a set of computing devices;

receiving a user request to add a second distributed computing service to be load balanced using the load balancing device, wherein the user request comprises an indication of a second content map for the second distributed computing service, wherein the second content map maps one or more second service parameters within the incoming traffic requests for the second distributed computing service to one or more second target devices within a second subset of computing devices of the set of computing devices;

responsive to receiving the user request, configuring the load balancing device, using the second content map, to transmit the incoming traffic requests associated with the second distributed computing service to computing devices within either a first data center or a second data center;

receiving an incoming traffic request comprising a set of service parameters associated with one or more distributed computing services hosted on the set of computing devices;

determining, based on the set of service parameters, the incoming traffic request corresponds to the second distributed computing service;

responsive to determining that the incoming traffic request corresponds to the second distributed computing service, determining, using the second content map within the routing configuration, a target computing device that is mapped, by the second content map, to the set of service parameters for the incoming traffic request; and transmitting the incoming traffic request to the target computing device.

19. The one or more non-transitory, computer-readable storage media of claim 18, wherein the instructions further cause the one or more processors to perform operations comprising:

extracting, from the set of service parameters, a subset of service parameters corresponding to the second distributed computing service;

comparing, by the load balancing device, the subset of service parameters with mapped service parameters within the second content map;

identifying, based on comparing the subset of service parameters, a subset of the mapped service parameters that match the subset of service parameters; and determining, based on the subset of the mapped service parameters of the second content map, a target device within the second subset of computing devices.

20. The one or more non-transitory, computer-readable storage media of claim 18, wherein the instructions further cause the one or more processors to perform operations comprising:

determining, from the set of service parameters for a new incoming traffic request, a combination of service parameters that does not exist within an installed content map of the routing configuration;

inputting the combination of service parameters into a machine learning model to determine, from the installed content map, a set of candidate target computing devices for servicing the new incoming traffic request associated with the combination of service parameters; and generating a new content map that maps the combination of service parameters to one or more candidate target computing devices within the set of candidate target computing devices.

\* \* \* \* \*